US010731018B2

(12) United States Patent
Loy et al.

(10) Patent No.: US 10,731,018 B2
(45) Date of Patent: Aug. 4, 2020

(54) ANTIOXIDANT POLYDIHYDROPYRIDAZINE AND POLYPYRIDAZINE FOAMS FROM 1,2,4,5-TETRAZINE

(71) Applicant: ARIZONA BOARD OF REGENTS ON BEHALF OF THE UNIVERSITY OF ARIZONA, Tucson, AZ (US)

(72) Inventors: Douglas A. Loy, Tucson, AZ (US); Robb E. Bagge, Tucson, AZ (US); Wenmo Sun, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 119 days.

(21) Appl. No.: 16/006,662

(22) Filed: Jun. 12, 2018

(65) Prior Publication Data
US 2018/0291170 A1   Oct. 11, 2018

Related U.S. Application Data

(63) Continuation-in-part of application No. 15/751,797, filed as application No. PCT/US2016/046199 on Aug. 9, 2016.

(60) Provisional application No. 62/518,348, filed on Jun. 12, 2017, provisional application No. 62/269,564, filed on Dec. 18, 2015, provisional application No. 62/203,828, filed on Aug. 11, 2015.

(51) Int. Cl.
| | |
|---|---|
| C07D 257/08 | (2006.01) |
| C08J 9/10 | (2006.01) |
| C08F 36/04 | (2006.01) |
| C08J 9/02 | (2006.01) |
| C08C 19/22 | (2006.01) |
| C08C 19/10 | (2006.01) |
| C08F 36/08 | (2006.01) |
| C08F 36/06 | (2006.01) |

(52) U.S. Cl.
CPC ............. *C08J 9/108* (2013.01); *C08C 19/10* (2013.01); *C08C 19/22* (2013.01); *C08F 36/045* (2013.01); *C08J 9/02* (2013.01); *C08F 36/06* (2013.01); *C08F 36/08* (2013.01); *C08J 2309/00* (2013.01); *C08J 2347/00* (2013.01)

(58) Field of Classification Search
CPC .... C08F 8/30; C08F 8/32; C08F 36/04; C08F 36/045; C08F 36/06; C08F 36/014; C08F 36/18; C08C 19/22
See application file for complete search history.

(56) References Cited

U.S. PATENT DOCUMENTS

| | | | |
|---|---|---|---|
| 3,022,305 A | 1/1965 | Carboni | |
| 4,559,369 A | 12/1985 | Bauman | |
| 4,704,408 A | 11/1987 | Krug | |
| 5,034,463 A | 7/1991 | Brokken-Zijp et al. | |
| 6,534,611 B1 | 3/2003 | Darling et al. | |
| 6,866,045 B1 | 3/2005 | Maillard et al. | |
| 2004/0262217 A1 | 12/2004 | Mori et al. | |
| 2004/0266940 A1 | 12/2004 | Issari | |
| 2009/0253015 A1 | 10/2009 | Onodera et al. | |
| 2009/0264544 A1 | 10/2009 | Loy | |
| 2010/0016545 A1 | 1/2010 | Wiessler et al. | |
| 2011/0171076 A1 | 7/2011 | Fansler et al. | |
| 2013/0253120 A1* | 9/2013 | Kulkarni | C07D 237/08 524/447 |
| 2013/0261272 A1 | 10/2013 | Herzog et al. | |
| 2014/0113844 A1* | 4/2014 | Haque | C10M 143/04 508/131 |
| 2014/0371396 A1 | 12/2014 | Van Rheenen et al. | |

FOREIGN PATENT DOCUMENTS

| | | |
|---|---|---|
| WO | WO2004047568 A1 | 6/2004 |
| WO | WO2009134227 A1 | 11/2009 |
| WO | WO2015121336 A1 | 8/2015 |
| WO | WO2015154078 A1 | 10/2015 |

OTHER PUBLICATIONS

Domasevitch, Dalton Trans., 2007, 3140-3148 (plus Supporting Materials) (Year: 2007).*
Sauer, Eur. J. Org. Chem. 1998, p. 2885-2896 (Year: 1998).*
And Heldmann, Tetrahedron Letters, vol. 38, No. 33, pp. 5791-5794, 1997 (Year: 1997).*
Kang, JW et al. Low-Loss Fluorinated Poly(Arylene Ether Sulfide) Waveguides with High 12.33Thermal Stability. Journal of Lightwave Technology. vol. 19. No. 6. Jun. 2001, pp. 872-875.
Loy D.A., Tetrazines for hydrogen storage. 59-th Annual Report on Research 2014 [online]. 55-57 Report 50941-ND7. 2014 (2014) [retrieved on Aug. 30, 2017). retrieved from the Internet: <https:llacswebcontent.acs.org/prfar/2014/Paper13084.html>. pp. 1-5.
Al-Malaika, S. In Reactive antioxidants for polymers, 1997; Blackie: 1997; pp. 266-302.
Heim, K. C. Natural polyphenol and flavonoid polymers. In: Cirillo G, Iemma F, eds. Antioxidant Polymers: Synthesis, Properties and Applications. Hoboken, NJ: Scrivener Publishing LLC and John Wiley & Sons Ltd; 2012, pp. 23-54.
Lei, H.; Huang, G.; Weng, G., Synthesis of a New Nanosilica-Based Antioxidant and Its Influence on the Anti-Oxidation Performance of Natural Rubber J. Macromol. Sci., Part B: Phys. 2013, 52, (1), 84-94.
Solera, P., New trends in polymer stabilization. J. Vinyl Addit. Technol. 1998, 4, (3), 197-210.

(Continued)

*Primary Examiner* — Robert C Boyle
(74) *Attorney, Agent, or Firm* — Nguyen Tarbet

(57) ABSTRACT

Antioxidant polymer foams and uses thereof are described herein. These foams are synthesized using a Carboni-Lindsey reaction of 1,2,4,5-tetrazine with a polymer having alkenyl functional groups. The foams feature dihydropyridazine functional groups which can be oxidized to consume surrounding reactive oxidizing chemicals and are consequently antioxidant.

8 Claims, No Drawings

(56) References Cited

OTHER PUBLICATIONS

Cerna, A.; Cibulkova, Z.; Simon, P.; Uhlar, J.; Lehocky, P., DSC study of selected antioxidants and their binary mixtures in styrene-butadiene rubber. Polym. Degrad. Stab. 2012, 97, (9), 1724-1729.

Jaiswal, S.; Varma, P. C. R.; O'Neill, L; Duffy, B.; Mchale, P., An investigation of the biochemical properties of tetrazines as potential coating additives. Mat Sci Eng C-Mater 2013, 33, (4), 1925-1934.

Polezhaev, A. V.; Maciulis, N. A.; Chen, C.-H.; Pink, M.; Lord, R. L.; Caulton, K. G., Tetrazine Assists Reduction of Water by Phosphines: Application in the Mitsunobu Reaction. Chem.—Eur. J. 2016, 22, (39), 13985-13998.

Audebert, P.; Sadki, S.; Miomandre, F.; Clavier, G., First example of an electroactive polymer issued from an oligothiophene substituted tetrazine. Electrochem Commun 2004, 6, (2), 144-147.

Fukuzumi, S.; Yuasa, J.; Suenobu, T., Scandium Ion-Promoted Reduction of Heterocyclic N:N Double Bond. Hydride Transfer vs Electron Transfer. J. Am. Chem. Soc. 2002, 124, (42), 12566-12573.

International Search Report Issued for PCT Application No. PCT/US16/46199 dated Jan. 26, 2017.

International Search Report Issued for PCT Application No. PCT/US17/24702 dated Jun. 27, 2017.

International Search Report Issued for PCT Application No. PCT/US17/25110 dated Jun. 22, 2017.

International Search Report Issued for PCT Application No. PCT/US17/40098 dated Sep. 29, 2017.

Alge et al. Synthetically Tractable Click Hydrogels for Three-Dimensional Cell Culture Formed Using Tetrazine-Norbornene Chemistry. Biomacromolecules. 2013, 14, 949-953.

Desai et al. Versatile click alginate hydrogels crosslinked via tetrazineenorbornene chemistry. Biomaterials 50 (2015) 30-37.

Sukwon Jung and Hyunmin Yi. An Integrated Approach for Enhanced Protein Conjugation and Capture with Viral Nanotemplates and Hydrogel Microparticle Platforms via Rapid Bioorthogonal Reactions. Langmuir. 2014, 30, 7762-7770.

Kawamoto et al. Dual Role for 1,2,4,5-Tetrazines in Polymer Networks: Combining Diels-Alder Reactions and Metal Coordination to Generate Functional Supramolecular Gels. ACS Macro Lett. 2015, 4, 458-461.

Knall et al. Inverse electron demand Diels-Alder (iEDDA) functionalisation of macroporous poly(dicyclopentadiene) foams. Chem. Commun., 2013, 49, 7325.

Liu et al. Theoretical Elucidation of the Origins of Substituent and Strain Effects on the Rates of Diels-Alder Reactions of 1,2,4,5-Tetrazines. J. Am. Chem. Soc. 2014, 136, 11483-11493.

Liu et al. Modular and orthogonal synthesis of hybrid polymers and networks. Chem. Commun., 2015, 51, 5218.

Tork et al. Molecular Dynamics of the Diels-Alder Reactions of Tetrazines with Alkenes and N2 Extrusions from Adducts. J. Am. Chem. Soc. 2015, 137, 4749-4758.

Zhang et al. Interfacial Bioorthogonal Cross-Linking. ACS Macro Lett. 2014, 3, 727-731.

Vazquez et al. Mechanism-Based Fluorogenic trans-Cyclooctene-Tetrazine Cycloaddition. Angew. Chem. Int. Ed. 2017, 56, 1334-1337.

Heldmann et al. Synthesis of Metallated (Metal = Si, Ge, Sn) Pyridazines by Cycloaddition of Metal Substituted Alkynes to 1,2,4,5-Tetrazine. Tetrahedron Letters, vol. 38, No. 33, pp. 5791-5794, 1997.

Sauer et al. 1,2,4,5-Tetrazine: Synthesis and Reactivity in [4I2] Cycloadditions. Eur. J. Org. Chem. 1998, 2885-2896.

Knall, Chem. Commun., 2013, 49, p. 7325-7327 (Year: 2013).

* cited by examiner

ANTIOXIDANT POLYDIHYDROPYRIDAZINE AND POLYPYRIDAZINE FOAMS FROM 1,2,4,5-TETRAZINE

CROSS REFERENCE

This application is a non-provisional of and claims priority to U.S. Provisional Patent Application No. 62/518,348, filed Jun. 12, 2017.

This application is a continuation-in-part of and claims priority to U.S. patent application Ser. No. 15/751,797, filed Feb. 9, 2018, which is a 371 of PCT/US16/46199 filed on Aug. 9, 2016, which claims priority to U.S. Provisional Patent Application No. 62/269,564 filed on Dec. 18, 2015, and U.S. Provisional Patent Application No. 62/203,828 filed on Aug. 11, 2015, the specifications of which are incorporated herein in their entirety by reference.

FIELD OF THE INVENTION

The present invention relates to compounds that may be used as antioxidants and/or inhibitors of free radical reactions, namely, polymer foams that are based on the reaction of tetrazines with unsaturated polymers.

BACKGROUND OF THE INVENTION

Like other polymeric materials, polymer foams are known to undergo degradation as a result of oxidation. The combination of heat, light, oxygen and other environmental oxidizing species can result in a decrease of polymer foam performance and integrity as the polymer chains become oxidized. Hence, manufacturers typically add antioxidizing agents and free radical inhibitors to preserve their products. Commonly, these antioxidizing agents are small-molecule additives which are not covalently bound within the polymer network.

To generate polymer foams, chemical or physical blowing agents are used. Chemical blowing agents are chemicals that take part in a reaction or decompose, giving off gaseous chemicals in the process. Physical blowing agents are gases that do not react chemically in the foaming process and are therefore inert to the polymer forming the matrix. Certain blowing agents such as chlorofluorocarbons (CFC's) have lost popularity as a result of their negative environmental impact.

In this invention, a method of polymer functionalization using 1,2,4,5-tetrazine has been developed which simultaneously, 1) generates polymer foams through a reaction which liberates nitrogen gas as an inert and environmentally friendly physical blowing agent and 2) modifies the polymer structure to give the materials antioxidant properties. The 1,2,4,5-tetrazine monomer is especially suitable for this application because of its cheap and easy synthesis, its solubility in unsaturated polymers and its lack of functional groups which could cause undesired polymer crosslinking. While many small molecules have low solubility in polymers and aromatic molecules such as tetrazines can also have limited solubility, the 1,2,4,5-tetrazine is soluble in some polymers (such as polybutadiene) and can even be reacted with some polymers without the addition of a solvent.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a novel class of polymeric foams which are synthesized using a Carboni-Lindsey reaction of 1,2,4,5-tetrazine with a polymer having alkenyl functional groups. The foams feature dihydropyridazine functional groups which can be oxidized to consume surrounding reactive oxidizing chemicals and are consequently antioxidant.

The Carboni-Lindsey reaction of tetrazine monomers with polymers having alkenyl groups is effective in the generation of polymer foams. In preferred embodiments, these polymer foams possess antioxidant properties. Without wishing to limit the present invention to a particular theory or mechanism, the dihydropyridazine groups of the modified polymer can be oxidized to consume one or more oxidizing species, thereby allowing the modified polymer to have antioxidant properties, One of the unique and inventive technical features of the present invention is the use of a specific tetrazine monomer, 1,2,4,5-tetrazine. This monomer has desirable characteristics which include, but are not limited to, cheap and easy synthesis, good solubility in unsaturated polymers, and lack of functional groups which could cause undesired crosslinking reactions. In one embodiment, the present invention features a method of synthesizing 1,2,4,5-tetrazine which is effective in providing a reaction yield which is about double the yield of previously reported syntheses for this monomer.

In other embodiments, the invention features methods to react the 1,2,4,5-tetrazine monomer with a polymer having alkenyl groups to form a polymer foam. In addition to generating polymer foams in an environmentally friendly manner, these methods can provide antioxidant materials.

In other embodiments, the present invention utilizes antioxidant polymer foams to consume reactive oxidizing chemicals. By decreasing the amount of oxidizing chemicals present in an environment, the polymer foams can serve to protect other substances from oxidation. None of the presently known prior references or work has the unique inventive technical feature of the present invention.

DESCRIPTION OF PREFERRED EMBODIMENTS

As known to one of ordinary skill in the art, a "radical" is a species having a single, unpaired electron. A radical species that is electrically neutral may be referred to as a "free radical". An "antioxidant" is a molecule that can inhibit the oxidation of other molecules. As known to one of ordinary skill in the art, the term "unsaturated" refers a molecule having a C=C double bond, e.g. alkenyl functional group. Unsaturated compounds include, but are not limited to, polymers, unsaturated oils, unsaturated lipids, unsaturated fats, and unsaturated monomers or polymer precursors. In some embodiments, unsaturated monomers can polymerize via chain radical polymerization of the alkenes. This is true for polymers such as polyethylene, polypropylene, polystyrene, and other vinylic polymers.

In one embodiment, the present invention features a method of synthesizing a tetrazine monomer in a one pot synthesis from a formamidine compound, a hydrazine compound, a nitrite compound and an acid, which react to form a 1,2,4,5-tetrazine compound. In some embodiments, the method may be performed at a temperature range of about 10° C. to 40° C.

Non-limiting examples of formamidine compounds include formamidine acetate and formamidine hydrochloride. Non-limiting examples of hydrazine compounds include hydrazine, hydrazine hydrate, hydrazine acetate, hydrazine dihydrochloride and hydrazine sulfate. Non-limiting examples of nitrite compounds include sodium nitrite, potassium nitrite and silver nitrite. Non-limiting examples of acids include acetic acid, hydrochloric acid, hydrobromic acid, sulfuric acid, nitric acid, carbonic acid, phosphoric acid and citric acid.

In some embodiments, a molar ratio of the formamidine compound: the hydrazine compound: the nitrite compound of can range from about 0.5-1.5:1-3:1-3. For example, the ratio may be 0.5:1:1 or 0.5:2:2 or 0.5:3:3 or 0.5:1:2 or 0.5:1:3 or 0.5:2:3 or 0.5:3:1 or 0.5:3:2 or 1:1:1 or 1:2:2 or 1:3:3 or 1:1:2 or 1:1:3 or 1:2:3 or 1:3:1 or 1:3:2 or 1.5:1:1 or 1.5:2:2 or 1.5:3:3 or 1.5:1:2 or 1.5:1:3 or 1.5:2:3 or 1.5:3:1 or 1.5:3:2, or any ratio in between.

In further embodiments, a yield of 1,2,4,5-tetrazine compound that is at least about 50% may be obtained. In other embodiments, a yield of at least about 60%, at least about 70%, at least above 80%, or at least above 90% may be obtained. Previously reported syntheses obtained a percent yield of 28%. Thus, one of the innovative features of this invention is to provide a method with about a twofold yield as compared to previously reported methods.

Without wishing to limit the invention to a particular theory or mechanism, the reaction yield can be increased by the order of addition of the reagents in the synthesis of 1,2,4,5-tetrazine. Whereas prior methods added an acid before adding a nitrite compound, the methods in the present invention add the nitrite compound first and then add the acid dropwise. In some embodiments, the nitrite compound and the acid compound can react to form a nitrous acid which oxidizes a dihydrotetrazine intermediate to form the 1,2,4,5-tetrazine. Dropwise addition of the acid may prevent excess gas generation and allow for more controlled production and reaction of the unstable nitrous acid which would result in a higher reaction yield.

Again, without wishing to limit the invention to a particular theory or mechanism, the reaction yield can be increased by the temperature at which the method is performed in the synthesis of 1,2,4,5-tetrazine. Whereas prior methods were performed at about 0-10° C., the methods in the present invention may be performed at room temperature in preferred embodiments. In some embodiments, the controlled production of the unstable nitrous acid allows the reaction to be performed at a higher temperature without forming unwanted sideproducts and that this decrease in the amount of sideproducts can increase the reaction yield. Without wishing to limit the invention to a particular theory or mechanism, the reaction yield can also be increased by immediately oxidizing the dihydrotetrazine intermediate after ring cyclization without the need to isolate the dihydrotetrazine intermediate.

In a preferred embodiment, the method may comprise: adding a formamidine and a hydrazine compound to a reaction vessel; wherein the formamidine compound and the hydrazine compound react to form a solid; adding aqueous solvent to said reaction vessel to dissolve the solid; subsequently adding a nitrite compound to said reaction vessel; and subsequently adding an acid dropwise to said reaction vessel; wherein the formamidine compound, the hydrazine compound, the nitrite compound and the acid react to form the 1,2,4,5-tetrazine compound, wherein a molar ratio of the formamidine compound: the hydrazine compound: the nitrite compound of ranges from about 0.5-1.5:1-3:1-3, and wherein the method is effective for producing a reaction yield of the 1,2,4,5-tetrazine compound that is at least about 50%.

Referring to Schemes 1 and 2, in some embodiments, modified polymers may be formed by reacting a polymer having alkenyl groups with one of more 1,2,4,5-tetrazine monomers. Without wishing to limit the invention to a particular theory or mechanism, each tetrazine monomer can react with one of the alkenyl functional groups of the polymer via a Carboni-Lindsey reaction, thereby forming a dihydropyridazine moiety attached to the polymer. In a preferred embodiment, the modified polymer is in the form of a foam.

Scheme 1. Non-limiting example of modification of poly-1,4-dienes with tetrazine:

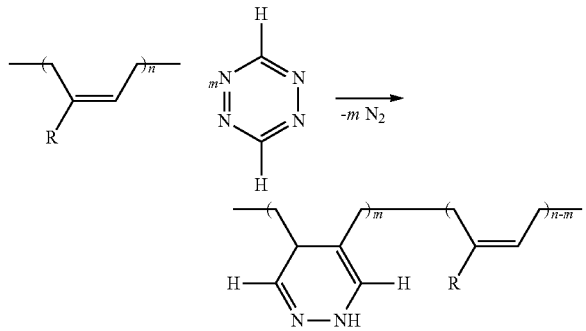

In some embodiments, n can range from about 5 to 10,000 and m can range from about 5 to 10,000. Non-limiting examples of R include: H, $CH_3$, Cl, Br or an alkyl group.

Scheme 2. Non-limiting example of modification of poly-1,2-dienes with tetrazine:

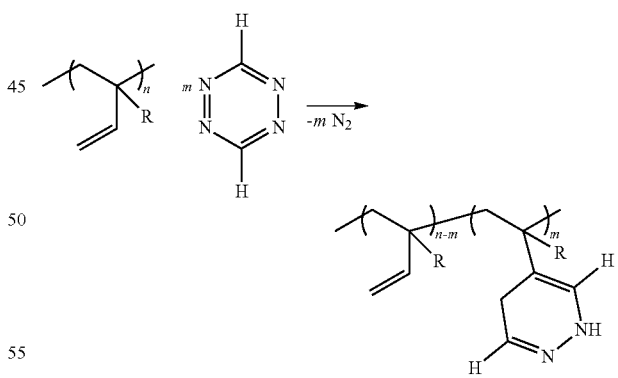

In some embodiments, n can range from about 5 to 10,000 and m can range from about 5 to 10,000. Non-limiting examples of R include: H, $CH_3$, Cl, Br or an alkyl group.

Again, without wishing to limit the invention to a particular theory or mechanism, at least one equivalent of nitrogen gas can be produced during the reaction of the tetrazine and the polymer having alkenyl groups for every equivalent of tetrazine used. In the present invention, a carbon dioxide gas is not produced during the reaction of a tetrazine component and a polymeric component unlike during the production of polyurethane. Therefore, the modified polymer can be considered as a greener material than polyurethanes, and the resulting foams provide an alternative to polyurethanes.

In one embodiment, the polymer having alkenyl groups may be a polydiene, a polybutadiene, a polyisoprene, a poly(divinylbenzene) or a polychloroprene. Other non-limiting examples of the polymer having alkenyl groups are as follows:

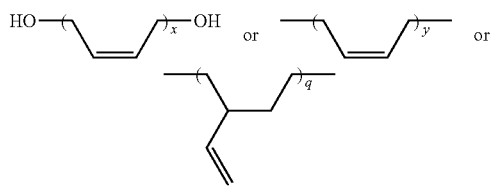

where x=5-10,000, y=5-10,000, and q=5-10,000.

According to some embodiments, an amount of the 1,2,4,5-tetrazine monomers is at least 5 mol % relative to the alkenyl functional groups. In other embodiments, an amount of the 1,2,4,5-tetrazine monomers relative to the alkenyl functional groups may be at least 10 mol %, at least 15 mol %, at least 20 mol %, at least 30 mol %, at least 40 mol %, at least 50 mol %, at least 60 mol %, at least 70 mol %, at least 80 mol %, at least 90 mol % or greater than 100 mol %.

In some embodiments, at least 90% of the alkenyl functional groups react with the 1,2,4,5-tetrazine monomers to form the dihydropyridazine groups. In other embodiments, at least 5%, at least 10%, at least 15%, at least 20%, at least 30%, at least 40%, at least 50%, at least 60%, at least 70%, or at least 80% of the alkenyl functional groups react with the 1,2,4,5-tetrazine monomers to form the dihydropyridazine groups.

In a preferred embodiment, the modified polymers may form a polymer foam. In other embodiments, the modified polymers may form a thin film, a membrane, a powder, a fiber, a gel or a particle.

Similar polymer modifications may be accomplished using other tetrazine monomers which are substituted at the 3 and 6 positions. An innovative feature of the present invention is the use of a specific tetrazine monomer, 1,2,4,5-tetrazine. This monomer has desirable characteristics which include, but are not limited to, cheap and easy synthesis, good solubility in unsaturated polymers, and lack of functional groups which could cause undesired crosslinking reactions. While many small molecules have low solubility in polymers and aromatic molecules such as tetrazines can also have limited solubility, the 1,2,4,5-tetrazine is soluble in some polymers (such as polybutadiene) and can even be reacted with some polymers without the addition of a solvent.

In yet other embodiments, the modified polymers may be colorless. Without wishing to limit the invention to a particular theory or mechanism, as the 1,2,4,5-tetrazine monomer is red in color, a colorless product indicates complete reaction of the tetrazine monomer.

In still further embodiments, the polymer foams may be thermoplastic foams. Crosslinking reactions can transform thermoplastic foams into thermoset foams. Without wishing to limit the invention to a particular theory or mechanism, because the 1,2,4,5-tetrazine monomer features a hydrogen atoms at each of the 3 and 6 positions instead of functional groups prone to substitution, these hydrogen atoms prevent crosslinking at the 3 and 6 positions.

Referring to scheme 3, in some embodiments, the dihydropyridazine groups of the modified polymers are capable of being oxidized by consuming one or more surrounding oxidizing species, thereby allowing the modified polymers to have antioxidant properties Scheme 3. A non-limiting reaction of oxidation of dihydropyridazine functionalized polymer.

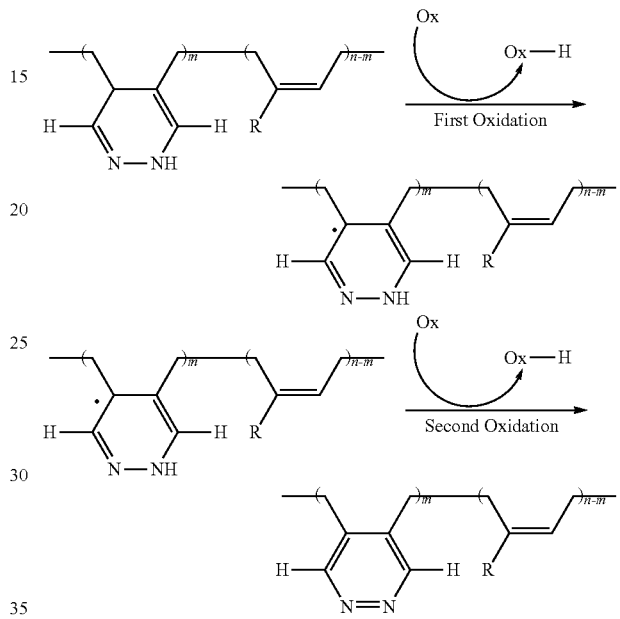

In some embodiments, n can range from about 5 to 10,000 and m can range from about 5 to 10,000. Non-limiting examples of R include: H, $CH_3$, Cl, Br or an alkyl group.

According to preferred embodiments, the modified polymers or polymer foams may be used as antioxidant additives to inhibit or retard free radical oxidation or polymerizations or oxidative corrosion through hydrogen atom donation. In one embodiment, the modified polymers may be used as replacements for compositions with separate polymers and antioxidants.

In some embodiments, the present invention may comprise a method of forming an antioxidant polymer foam. A non-limiting example may comprise providing a polymer having alkenyl functional groups, providing one or more 1,2,4,5-tetrazine monomers, wherein an amount of the 1,2,4,5-tetrazine monomers is at least 5 mol % relative to the alkenyl functional groups, and reacting the one or more 1,2,4,5-tetrazine monomers with the polymer. In further embodiments, the 1,2,4,5-tetrazine monomers may react with the alkenyl functional groups of the polymer to produce an antioxidant polymer foam having dihydropyridazine groups which are capable of being oxidized by consuming one or more surrounding oxidizing species, thereby allowing the polymer foam to have antioxidant properties. In still further embodiments, a hydrogen atom at each of the 3 and 6 positions of said 1,2,4,5-tetrazine monomers may prevent crosslinking at the 3 and 6 positions.

According to some embodiments, a method for inhibiting oxidation of a reactive chemical compound may comprise providing a modified polymer, wherein said modified polymer is prepared from: a polymer having alkenyl functional groups; and one or more 1,2,4,5-tetrazine monomers, wherein the 1,2,4,5-tetrazine reacts with the alkenyl functional group of the polymer to produce the modified polymer with dihydropyridazine groups; and adding said modified polymer to said reactive chemical compound in an amount sufficient to inhibit oxidation of said reactive chemical compound, wherein the dihydropyridazine groups of the modified polymer are capable of being oxidized by consuming one or more surrounding oxidizing species, thereby inhibiting oxidation of said reactive chemical compound.

As used herein, the term "reactive chemical compound" refers to a compound susceptible to oxidation. Some non-limiting examples are metals, organic compounds, inorganic compounds, polymers, composites, industrial chemicals, foods, beverages, cosmetics and pharmaceuticals.

In some embodiments, the polymer foams described herein may be used to replace other commercially available polymer foams. Non-limiting examples of such foams include polystyrene, polyurethane, polyvinyl chloride, and silicone foams. In other embodiments, the polymer foams described herein may replace compositions which comprise commercially available polymer foams and antioxidant additives.

In another embodiment, the present invention features an antioxidant polymer foam with high surface area. The antioxidant polymer foams may be used in applications where high surface area antioxidant material are required. Such applications include but are not limited to air filtration, gas filtration, smoke filtration, water filtration, solvent filtration, mixed aqueous/organic solution filtration, waste neutralization and oxygen removal.

In one embodiment, the present invention features a method for inhibiting oxidation of an unsaturated compound. The method may comprise introducing any one of the modified polymers disclosed herein into proximity with the unsaturated compound. Preferably, an amount of said hydrotetrazine compound is sufficient to inhibit oxidation of said unsaturated compound. In some embodiments, the unsaturated compound may be an unsaturated oil, an unsaturated lipid, an unsaturated fat, or an unsaturated monomer.

According to another embodiment, the present invention features a method for inhibiting corrosion of a metallic substrate. The method may comprise introducing any one of the modified polymers disclosed herein into proximity with the metallic substrate. Some non-limiting examples of this method include using the modified polymers as a coating, as a filler, as a packaging material, as an insulator, as a dampener, as a lining, or as an encapsulant. In a preferred embodiment, an amount of said modified polymer is sufficient to inhibit the corrosion, such as rusting or pitting, of the metallic substrate. In some embodiments, the metallic substrate may be constructed from a ferrous material, carbon steel, stainless steel, brass, copper, alloys thereof, and the like. Examples of metallic substrates include, but are not limited to, metal sheeting, metal pipes, metal rods, metal studs, metal fasteners, metal furniture, metal containers, and metal parts for vehicles or machinery.

According to another embodiment, the present invention features a method of inhibiting free radical polymerization of unsaturated monomers. The method may comprise introducing any one of the modified polymers disclosed herein into proximity with the unsaturated monomers. Preferably, an amount of said modified polymer is sufficient to inhibit free radical polymerization of said unsaturated monomers. In one embodiment, the unsaturated monomers may comprise an alkenyl moiety. In another embodiment, the unsaturated monomers may be styrene monomers, ethylene monomers, propylene monomers, vinylic monomers, and the like.

In some embodiments, the present invention features a method for stabilizing a reactive chemical composition. The method may comprise adding any one of the modified polymers disclosed herein to the reactive chemical composition. The modified polymer may be added in an amount that is sufficient to inhibit oxidation and free radical chain reactions from occurring in the reactive chemical composition.

EXAMPLES

The following are non-limiting examples of the present invention, in particular, the synthesis of 1,2,4,5-tetrazined and formation of polymer foams. The examples are for illustrative purposes only and are not intended to limit the invention in any way. Equivalents or substitutes are within the scope of the invention.

1,2,4,5-tetrazine synthesis: To 5.20 g (50 mmol) of formamidine acetate in a 100 mL Erlenmeyer flask 5 g (100 mmol) of hydrazine monohydrate was added under air. White solid formed shortly after the addition. The mixture was stirred at room temperature for one hour. The solid in the mixture was dissolved by 50 mL water, turning dark red. Sodium nitrite (6.9 g, 0.1 mole) was added into the mixture, then glacial acetic acid (5.88 mL) was added dropwise with the evolution of gas. The resulting solution was extracted with DCM. Evaporation of DCM left red crystals (1.18 g, 58% yield). $^1$H (400 MHz, CDCl$_3$) δ 10.39 (2H, s); $^{13}$C (100 MHz, CDCl$_3$) 160.51.

Polybutadiene based s-tetrazine polymer foams: To polybutadiene (0.216 g, 4 mmol) in a 20 mL scintillation vial, 50 mol % of s-tetrazine (1,2,4,5-tetrazine) was added. Similar experiments were set up with 25 mol %, 10 mol %, 5 mol %, 2.5 mol % and 1 mol % of s-tetrazine. As soon as s-tetrazine was added, small and uniform bubbles were generated, causing the polymer to foam. After 24 hours, samples made with 5 mol % tetrazine and greater remained uniform, colorless foams. The samples with 1 and 2.5 mol % tetrazine and converted into a tacky, transparent, colorless film.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A method for producing a tetrazine compound in a one-pot synthesis,
wherein the tetrazine compound is a 1,2,4,5-tetrazine compound according to the formula:

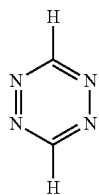

wherein the method comprises:
a. adding a formamidine compound to a reaction vessel;
b. adding a hydrazine compound to said reaction vessel;
c. subsequently adding a nitrite compound to said reaction vessel; and
d. subsequently adding an acid to said reaction vessel;
wherein the formamidine compound, the hydrazine compound, the nitrite compound and the acid react to form the 1,2,4,5-tetrazine compound, wherein a molar ratio of the formamidine compound: the hydrazine compound: the nitrite compound of ranges from about 0.5-1.5: 1-3: 1-3, and wherein the method is effective for producing a reaction yield of the 1,2,4,5-tetrazine compound that is at least about 50%.

2. The method of claim 1, wherein the formamidine compound is formamidine acetate.

3. The method of claim 1, wherein the hydrazine compound is hydrazine monohydrate.

4. The method of claim 1, wherein the nitrite compound is sodium nitrite, potassium nitrite or silver nitrite.

5. The method of claim 1, wherein the acid is acetic acid.

6. The method of claim 1, wherein the method is performed at room temperature.

7. The method of claim 1, wherein the formamidine compound and the hydrazine compound react to form a solid.

8. The method of claim 7, wherein aqueous solvent is added to the reaction vessel and dissolves the solid before addition of the nitrite compound or the acid.

* * * * *